United States Patent [19]
Tafara

[11] 4,253,959
[45] Mar. 3, 1981

[54] LIQUID FILTER VESSEL

[76] Inventor: Peter T. Tafara, 4803 Spring St., Neptune, N.J. 07753

[21] Appl. No.: 55,629

[22] Filed: Jul. 9, 1979

[51] Int. Cl.³ .............................................. B01D 29/10
[52] U.S. Cl. .................................... 210/232; 210/452; 210/478
[58] Field of Search .............. 210/232, 451, 452, 473, 210/477–481, 484, 485, 238, 448

[56] References Cited

U.S. PATENT DOCUMENTS

| | | | |
|---|---|---|---|
| 1,567,937 | 12/1925 | Galarneau | 210/480 |
| 3,631,987 | 1/1972 | Cattano, Sr. | 210/452 |
| 3,640,392 | 2/1972 | Smith et al. | 210/451 X |
| 3,771,664 | 11/1973 | Schrink et al. | 210/484 X |
| 3,847,819 | 11/1974 | Firth | 210/448 |
| 3,931,015 | 1/1976 | Jenkins | 210/451 X |
| 4,133,769 | 1/1979 | Morgan, Jr. | 210/477 X |

FOREIGN PATENT DOCUMENTS 1527 of 1905 United Kingdom ..................... 210/452

*Primary Examiner*—Benoît Castel
*Attorney, Agent, or Firm*—Martin Sachs

[57] ABSTRACT

A liquid filter vessel used for the filtering of liquid in a permanent installation provides for a simplified method of replacing the filter bag and includes a removable cover which displaces a relatively large volume of liquid. Removal of the cover from the filter housing, reduces the liquid level within the housing to a level below the lip of the filter bag, making it easy to grab the lip thereof, and remove the bag without coming into contact with the liquid being filtered.

5 Claims, 3 Drawing Figures

LIQUID FILTER VESSEL

BACKGROUND OF THE INVENTION

1. Field of the Invention

The present invention relates to filters, and in particular, to a liquid filter vessel which provides for easy replacement of the associated filter bag, without contaminating the fluid remaining in the housing.

2. Description of the Relevant Art

Many different filters are in use today in industry. A major concern with the industrial type filter is the ease in which the filter elements can be replaced, since it requires shut-down of the production facility in order to provide this type of maintenance. Many elaborate arrangements are utilized today to make the time consuming job of changing filters acceptable. One approach to simplifying this task is disclosed in U.S. Pat. No. 3,640,392 issued to E. A. Smith et al on Feb. 8, 1972. The Smith et al disclosure overcame the problems known in the prior art, by eliminating the need for disconnecting couplings, flexible hoses, or other types of means for manually disconnecting the liquid inlet line, in order to open the top of the filter vessel. The apparatus disclosed therein provides for a permanent plumbing connection for the pressurized liquid being filtered and does not interfere with the easy opening of the vessel for inspection, replacement of the filter bag and cleaning. The vessel is provided with a cover connected by a unique hinge, contains a basket supported filter bag for filtering the liquid under pressure that enters the mouth of the bag through an inlet in the cover and is discharged through an outlet in the bottom of the vessel. The hinge is provided with a liquid inlet passage which communicates with a liquid supply plumbing connection that is permanent and need not be disturbed when the cover is opened or closed. An annular seal is provided by the rim of the filter basket disposed on the annular wall of the body of the vessel, so that when the cover is closed and clamped, leakage of the pressurized liquid is prevented above the bag, as well as from the vessel itself. The plumbing required to provide for a pressurized liquid into the cover arrangement as disclosed, requires a movable plumbing joint which has a tendency to wear with time, and thereby, permits the pressurized fluid to leak out of the connection. The filter basket requires a unique configuration and utilizes a pair of "O-rings" to provide the liquid type seal in order to prevent leakage between the cover and the vessel housing.

Another type of filter utilized to filter water in swimming pools includes a filter vessel and a rigid, porously fabricated filter basket, which is adapted to receive a filter bag therein. The basket or support member provides a cushioning effect for the filter bag, and prevents the filter bag from coming into contact with the inner tank. The filter basket construction is comprised of a plurality of circumferentially arranged, longitudinally extending fibrous tubes positioned relative to each other, so as to form a cylinder, and fibers bonded on the inside and outside diameters of the cylinders. This filter system is designed for use in relatively low pressure systems, and makes no provision for dispersing the incoming liquid, so that it encompasses the entire surface of the filter bag.

The present invention overcomes the shortcomings found in the known art, by providing a filter vessel which is fabricated of non-metallic parts, is capable of being used under relatively high pressures, and is ideally suited for industrial usage where contamination of the liquids being filtered is of major importance, as well as, the amount of down time required to change the filter element.

SUMMARY OF THE INVENTION

A liquid filter vessel, according to the principles of the present invention, comprises a housing having inlet and outlet means; porous basket means disposed within the housing is adapted to receive a filter bag therein. A cover means is provided for cooperating with and sealing the housing. The cover means is provided with a centrally disposed portion terminating in an outwardly extending flange having apertures provided therein. A coaxial second portion extends beyond the flange. The cover means flange cooperates with the porous basket means to retain the filter bag in place when the cover means is in position on the housing.

BRIEF DESCRIPTION OF THE DRAWINGS

In order that the invention may be more fully understood, it will now be described, by way of example, with reference to the accompanying drawing, in which.

DESCRIPTION OF THE PREFERRED EMBODIMENT

Figure 1:
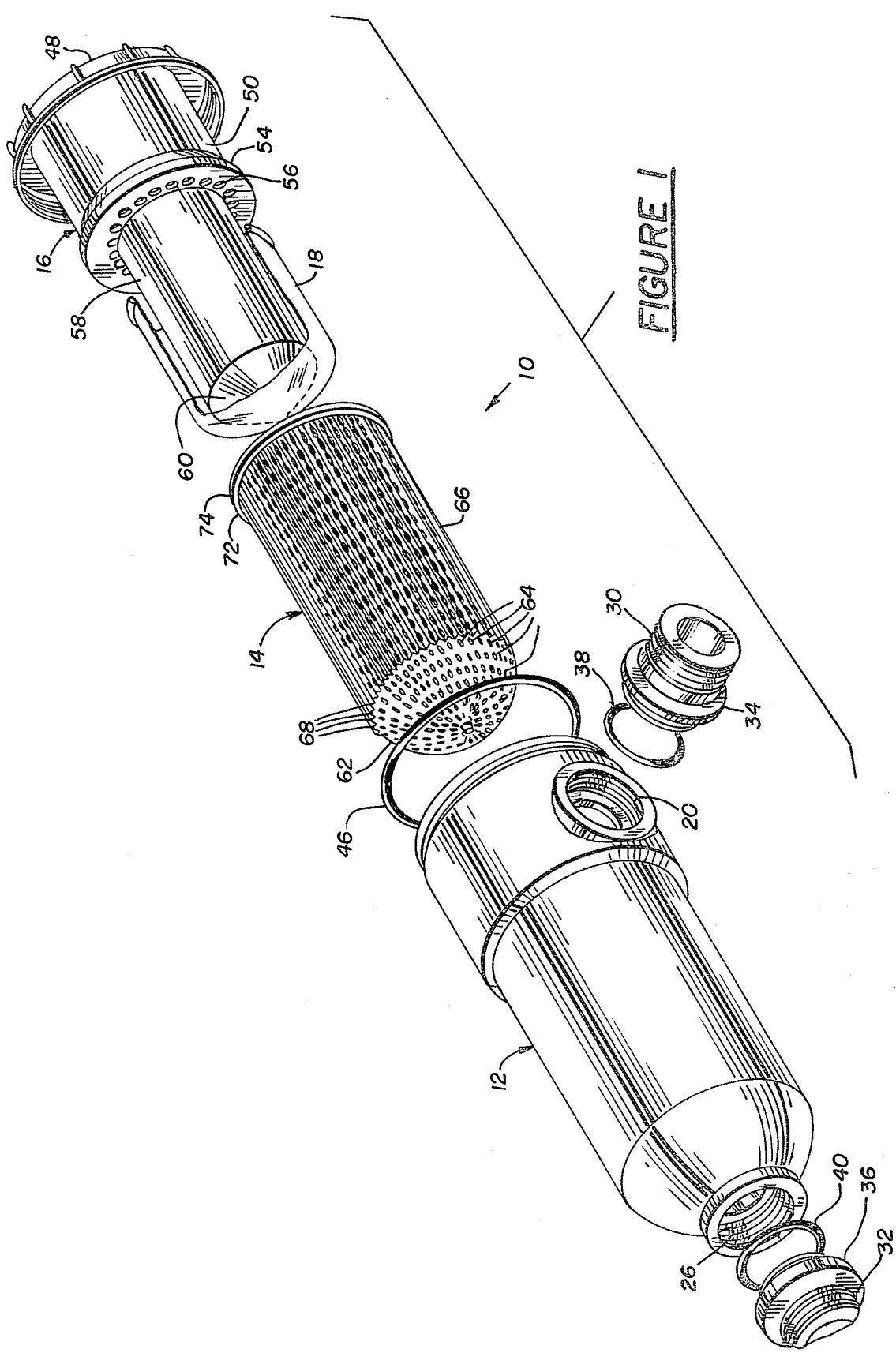
FIG. 1 is an exploded isometric view of the liquid filter vessel, according to the principles of the present invention.
Figure 2:
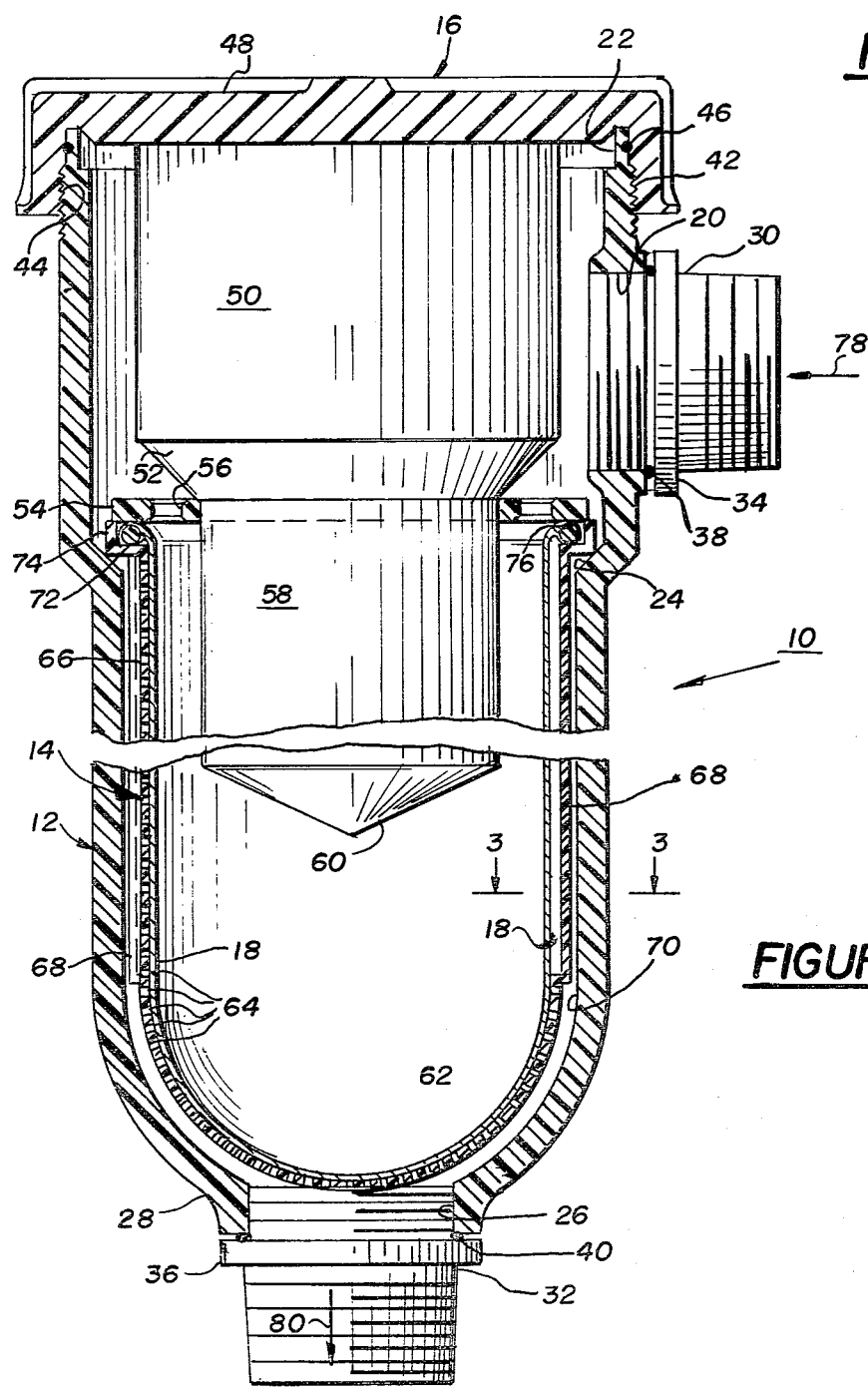
FIG. 2 is a cross-sectional view in elevation of the filter vessel of FIG. 1 fully assembled.

Referring now to the figures, and in particular FIGS. 1 and 2, there is shown a liquid filter vessel 10 which includes a housing 12, a porous basket 14, and a cover assembly 16. The porous basket 14 is adapted to receive a filter bag 18 therein, which is of conventional design.

The housing 12 is provided with an inlet aperture 20 disposed proximate the open end 22 of the housing 12, between the edge thereof, and an internally extending ledge 24. In the preferred embodiment the housing 12 is preferably tubular shaped, so that the ledge 24 extends completely around the internal circumference of the housing 12. The ledge 24 is preferably sloped downwardly and its function will be explained in more detail, hereinafter. The housing 12 is also provided with an outlet aperture 26, preferably, centrally disposed at the bottom closed end 28 of the housing. Apertures 20 and 26 are internally threaded and adapted to receive therein bushings 30 and 32, respectively, which are also threaded on the outwardly extending portions thereof, to mate with conventional plumbing lines, not shown. The bushings are readily replaceable and therefore damaging or misthreading by the conventional piping to the bushing merely requires replacement of the bushing and not the entire filter housing. Beneath the flange portions 34 and 36, respectively, a groove for retaining O-rings 38 and 40, respectively, is provided. This enables the bushings 30 and 32 to be inserted in the housing 12 and sealed therein, so that fluid in the housing is unable to leak out around the bushing apertures 20 and 26.

The open end 22 of housing 12 is also provided with an externally threaded portion 42 which is adapted to cooperate with the internally threaded portion 44 provided on the cover assembly 16. Proximate the edge of the open end 22, a groove is provided into which an O-ring 46 is disposed to provide a liquid tight seal, once the cover 16 is threaded thereon.

The cover assembly 16 is preferably circular shaped and mates with the housing 12 completing a sealed liquid filter vessel 10. Centrally disposed from the upper portion 48 of the cover assembly 16 is a cylindrically shaped first portion 50, which is affixed to the cover portion by any suitable means, such as by a chemical bond, glueing, or alternatively molded as one solid piece. The first portion extends away from the upper portion in a downwardly direction, as shown in FIG. 2, and is provided with a tapered edge 52, which terminates in an outwardly extending flange 54, that is provided with a plurality of apertures 56 equally disposed about the periphery of the flange 54. A second conically-shaped portion 58 extends coaxially in a downward direction beyond the flange 54, and preferably terminates in a conically-shaped end 60 which extends into the porous basket 14. The first portion 50 and the second portion 58 are specifically designed to displace a relatively large volume of liquid, the purpose of which will be explained hereinafter. Portions 58 and 50 may be made from hollow members with a solid cap 60 placed thereon, in order to conserve raw material.

The porous basket 14 is preferably cylindrically-shaped, terminating in essentially a hemisphere 62 and includes a plurality of apertures 64 located throughout the end surface 62 and the cylindrical-shaped portion 66. The cylindrically-shaped portion 66 is provided with a plurality of axially disposed ribs 68 extending outwardly from the surface of the cylindrically-shaped portion 66. The apertures 64 are spaced in between the ribs 68 and readily provide for liquid flow therethrough. The ribs 66 provide a dual function. They strengthen the basket and also insure that the surface 66 does not come into contact with the inner surface 70 of the housing 12. The open end of the basket 14 is provided with an outwardly extending flange 72 which terminates in a vertically disposed annular ring 74. The flange 72 alternatively may be formed of a solid ring having a peripheral groove provided in the upper surface of the flange 72. This groove or flange portion 72 is preferably made to receive the expanded or protruding lip portion 76 of a conventional filter bag 18 disposed within the basket 14.

Preferably the cover assembly 16, porous basket 14 and housing 12 are fabricated from polypropylene material, and therefore is ideally suited for use with corrosive acids or other materials, since the polypropylene will not interact with them or cause any contamination.

Figure 3:
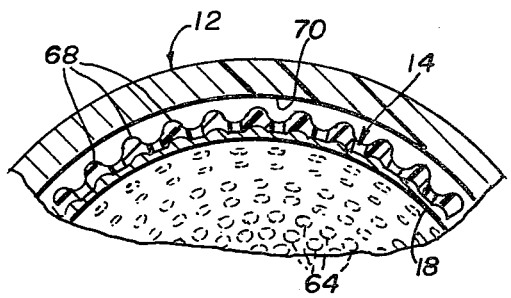
FIG. 3 is an exploded partial view taken along the line 3—3 of FIG. 2.

FIG. 3 shows an enlarged portion of the housing 12 with the ribbed basket 14 positioned therein. The filter bag 18 is also shown in its relative position in the basket 14.

In operation, the filter bag 18 is inserted into the porous basket 14 with the lip portion 76 of the filter bag being placed in the groove or flange portion 72 provided therefor. The assembly is then placed into the hollow housing 12 where the external corner of flange 72 rests upon the sloped ledge 24. Preferably, the lip 76 is slightly greater than the groove or depression provided in flange 72, so that it extends beyond the upper portion of the annular ring 74. The cover assembly 16 is then inserted into the housing 12, the second portion 58 extending into the filter bag and basket, so that the flange 54 comes into intimate contact with the filter bag lip 76. As the upper portion 48 of the cover assembly is rotated on the housing 12, in order to form a complete seal, the lip 76 is compressed until the flange 54 comes into contact with the annular ring 74, maintaining the filter bag in position and sealing the housing 12. When liquid under pressure is applied in the direction of arrow 78 into the filter vessel 10, it is dispersed about the circumference of the cylindrically-shaped first portion 50, and flows through apertures 56 provided in outwardly extending flange 54. Unfiltered liquid is unable to flow around the outside of the filter basket 14, since the external edge of flange 72 is in intimate and pressure contact with the sloped ledge 24 provided in housing 12. The liquid will therefore be equally directed about the circumference of the first portion 50, be required to flow through filter bag 18, and then through the apertures provided in the porous basket 14, and thence exit from outlet aperture 26 in the direction of arrow 80. Large foreign bodies appearing in the liquid to be filtered are trapped by the apertures 56 in flange 54 and retained there. Smaller particles are retained by the filter bag 18 as the fluid flows therethrough. The ribbed portions 68 of the porous basket 14 insures that the fluid flow is enhanced as it flows through the apertures 64 therein, since they are spaced from the inner wall 70 of the housing 12.

After a period of time when the flow through the filter has been reduced because of foreign particles captured therein, or alternatively after a prescribed period of operation, the system may be shut down, the filter bag replaced and cover assembly 16 washed to remove large particles which may become trapped upon the flange 54. Upon removal of the cover assembly 16 with the fluid pressure turned off, the liquid in the housing 12 will fall below the lip 76 on the filter basket, thereby preventing any particles which have been captured by the filter basket from returning back into the input flow path. The lip of the filter bag is readily accessible and therefore, the filter bag may be easily removed from the housing 12. A new filter bag may be inserted in the porous basket 14 by placing it therein, or the filter basket 14 may be removed from the housing for inspection.

Hereinbefore, has been disclosed a liquid filter vessel which provides for efficient, relatively maintenance free filtering of liquids, and prevents the contamination of the fluid being filtered when the filter bag is being replaced. It will be understood that various changes in the details, materials, arrangement of parts and operating conditions which have been herein described and illustrated in order to explain the nature of the invention, may be made by those skilled in the art within the principles and the scope of the instant invention.

Having thus set forth the nature of the invention, what is claimed is:

1. A liquid filter vessel comprising:
 (a) an elongated hollow housing having an open end and a closed end, said housing being provided with an internally protruding ledge disposed away from said open end, inlet and outlet means and an externally threaded portion disposed proximate said open end, said inlet means being disposed between said ledge and said open end, said outlet means being disposed proximate said closed end:
 (b) a filter bag having a protruding lip portion;
 (c) porous basket means disposed within said housing, said basket means being provided with a plurality of axially disposed and closely spaced external ribs for strengthening said basket means and positioning said basket means away from the internal wall of said housing for enhancing the liquid flow and an outwardly extending flange for cooperating with said housing ledge and centrally positioning said basket means within said housing, said basket means being provided with a peripheral groove in the upper surface of said flange for receiving the lip portion of said filter bag; and (d) threaded cover means for cooperating with said housing threaded portion and sealing said housing open end, said cover means being provided with a first centrally disposed portion terminating in an outwardly extending flange having apertures provided therein and a coaxial second portion extending beyond said flange, said cover means flange cooperating with said basket means peripheral groove to retain the lip of said filter bag in place when said cover means is in position, said cover means, housing and basket means being fabricated from non-metallic materials.

2. A liquid filter vessel according to claim 1 wherein said internally protruding ledge upon which said basket means flange rests is sloped.

3. A liquid filter vessel according to claim 1 wherein said inlet and outlet means include removable bushing means for connection to fixed piping.

4. A liquid filter vessel according to claim 1 wherein said housing, said basket means and said cover means are fabricated from polypropylene.

5. A liquid filter vessel according to claim 1 wherein said cover means second portion is provided with a conically-shaped terminal end, said cover means first and second portions displacing a sufficient volume of liquid so that upon removal of said cover means, the remaining liquid in said housing is below the level of the lip of said filter bag.

* * * * *